United States Patent
Corbaton et al.

(10) Patent No.: US 6,745,052 B2
(45) Date of Patent: Jun. 1, 2004

(54) METHOD AND APPARATUS FOR SIGNAL EQUALIZATION IN A COMMUNICATION SYSTEM WITH MULTIPLE RECEIVER ANTENNAS

(75) Inventors: Ivan Jesus Fernandez Corbaton, San Diego, CA (US); John E. Smee, San Diego, CA (US); Srikant Jayaraman, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 109 days.

(21) Appl. No.: 09/918,770

(22) Filed: Jul. 27, 2001

(65) Prior Publication Data

US 2003/0027598 A1 Feb. 6, 2003

(51) Int. Cl.[7] .................................................. H04M 1/00
(52) U.S. Cl. ....................... 455/562.1; 455/134; 455/135; 455/501; 455/132; 310/329; 310/334
(58) Field of Search ................................. 455/562, 550, 455/561, 500, 501, 504, 506, 63, 67.1, 132–137, 562.1, 63.1, 67.11, 67.13; 370/431, 329, 320, 334, 342, 343, 479; 375/316, 346, 348; 342/378, 373

(56) References Cited

U.S. PATENT DOCUMENTS

| | | | | |
|---|---|---|---|---|
| 5,973,642 A | * | 10/1999 | Li et al. | 342/378 |
| 6,243,415 B1 | * | 6/2001 | Pipon et al. | 375/232 |
| 6,434,375 B1 | * | 8/2002 | Chulajata et al. | 455/276.1 |
| 6,496,534 B1 | * | 12/2002 | Shimizu et al. | 375/148 |
| 6,507,605 B1 | * | 1/2003 | Fukumoto et al. | 375/152 |
| 2002/0032004 A1 | * | 3/2002 | Widrow | 455/22 |
| 2003/0072382 A1 | * | 4/2003 | Raleigh et al. | 375/267 |

OTHER PUBLICATIONS

Hanks H. Zeng et al (1997 IEEE 1058–6393/97) "behavior of fractionally spaced constant modulus algorithm: mean square erro robustness and local minima".*

* cited by examiner

Primary Examiner—Nay Maung
Assistant Examiner—Edan Orgad
(74) Attorney, Agent, or Firm—Philip R. Wadsworth; Thien Nguyen; S. Hossain Beladi

(57) ABSTRACT

A communication receiver (400) minimizes a combined local and global mean square error for signal equalization. A base station (101) or a mobile station (102–104) may include a plurality of antennas (292) for receiving a plurality of signals transmitted from a common source. The plurality of signals carry a common stream of data symbols. A preprocessing block (299) processes the received signals to produce a plurality of processed received signals (298). A signal equalizer (401) minimizes a combined local and global MSE over the processed received signals (298) to produce a combined signal (499). A decoder decodes the combined signal (499) to retrieve the stream of data symbols. A processor is configured for combining a local MSE and a global MSE in accordance with an adjustable weighting factor $\alpha$ to produce the combined local and global MSE.

23 Claims, 3 Drawing Sheets

METHOD AND APPARATUS FOR SIGNAL EQUALIZATION IN A COMMUNICATION SYSTEM WITH MULTIPLE RECEIVER ANTENNAS

FIELD

The present invention relates generally to the field of communications, and more specifically, to communications over a dispersive channel with multiple receiver antennas.

BACKGROUND

The communication channel between a transmitter and a receiver may be time varying and dispersive. The dispersion of the channel may result in multipath and inter-symbol interference (ISI) and a receiver may need special processing to counteract these and possibly other time varying effects. Such a receiver may include an equalizer for reducing the effect of multipath interference and ISI.

To this end as well as others, there is a need for an effective equalizer in a communication system.

SUMMARY

A communication receiver performs signal equalization by minimizing a combined local and global mean square error (MSE). A receiver may include a plurality of antennas for receiving a plurality of signals transmitted from a common source. The plurality of signals carry a common stream of data symbols. A pre-processing block processes the received signals to produce a plurality of processed received signals. In local optimization, the temporal coefficients for the signals from different antenna are optimized based solely on minimizing the MSE between the transmitted symbol and the local estimate of the transmitted symbol. In Global Optimization, the temporal coefficients and spatial combiner weights for signals from all antennas are optimized jointly to minimize the global MSE. A signal equalizer minimizes a combined local and global MSE over the processed received signals to produce a combined signal. A decoder decodes the combined signal to retrieve the stream of data symbols. A processor is configured for combining a local MSE and a global MSE in accordance with a weighting factor α to produce the combined local and global MSE. The processor is configured for adjusting the weighting factor a to achieve a corresponding effect of adaptation speed and error magnitude in minimizing the combined local and global the MSE.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Various aspects of the invention may be incorporated in a system for wireless communications in accordance with the code division multiple access (CDMA) technique. Various CDMA communication techniques have been disclosed and described in various standards published by the Telecommunication Industry Association (TIA). Such standards include the TIA/EIA-95 standard, TIA/EIA-IS-2000 standard, IMT-2000 standard, and WCDMA standard, all incorporated by reference herein. In addition, the specification defined as "TIA/EIA/IS-856 cdma2000 High Rate Packet Data Air Interface Specification," incorporated by reference herein, also provides for a system wherein one or more aspects of the invention may be incorporated.

This invention relates generally to a novel and improved method and apparatus for signal equalization in a communication system. One or more exemplary embodiments described herein are set forth in the context of a wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
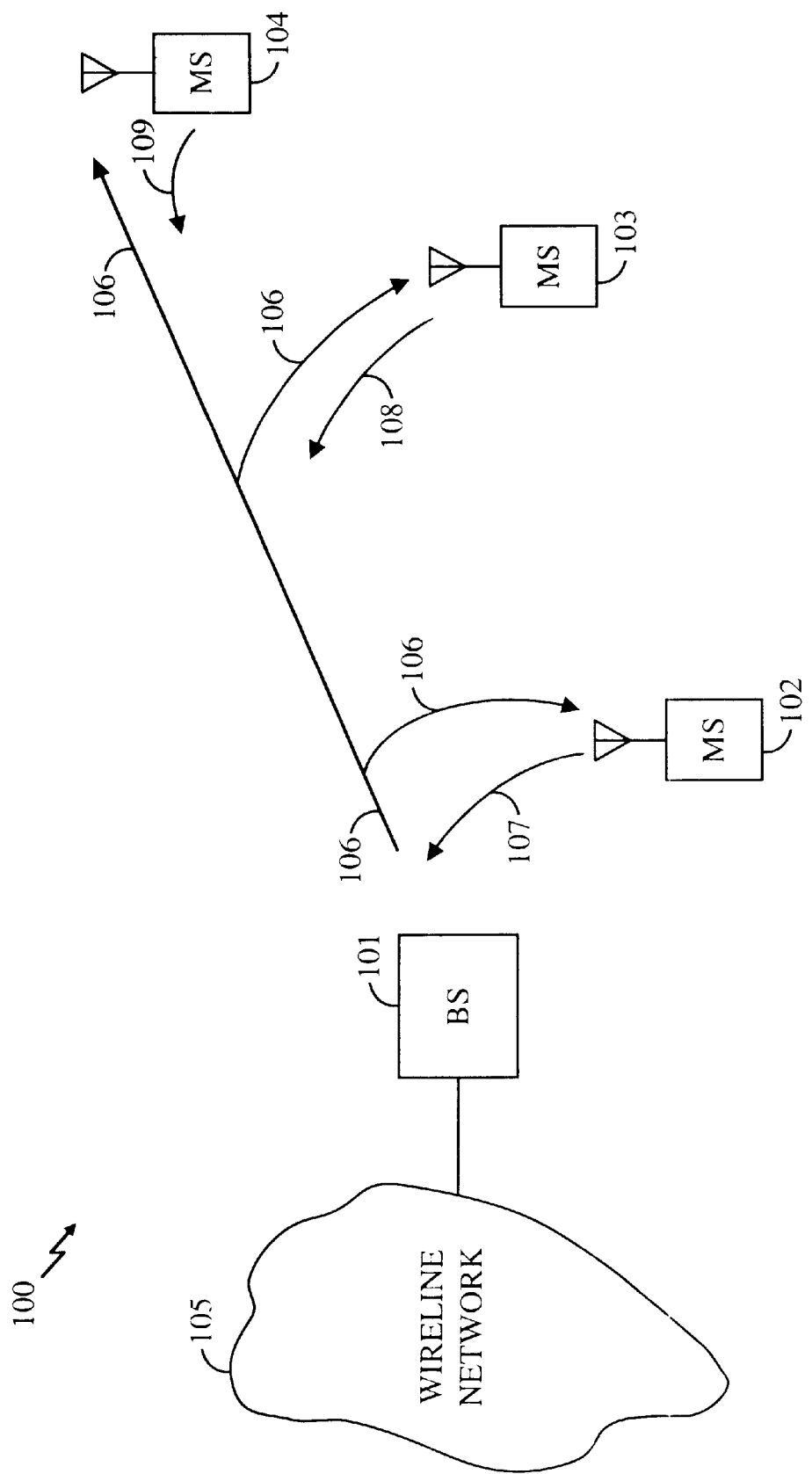
FIG. 1 illustrates a communication system capable of operating in accordance with various embodiments of the invention.

FIG. 1 illustrates a general block diagram of a communication system 100 capable of operating in accordance with any of the code division multiple access (CDMA) communication system standards. Generally, communication system 100 includes a base station 101 that provides communication links between a number of mobile stations, such as mobile stations 102–104, and between the mobile stations 102–104 and a wireline network 105. Base station 101 may include a number of components, such as a mobile station controller, a base station controller, and a radio frequency transceiver. For simplicity, such components are not shown. Base station 101 may also be in communication with other base stations (not shown). Base station 101 communicates with each mobile station 102–104 via a forward link. The forward link may be maintained by a forward link signal transmitted from base station 101. The forward link signals targeted for several mobile stations 102–104 may be summed to form a forward link signal 106. Each of the mobile stations 102–104 receiving forward link signal 106 decodes the forward link signal 106 to extract the information that is targeted for its user. At the receiving end, the receiver may treat as interference the portion of the received forward link signal 106 targeted for others.

Mobile stations 102–104 communicate with base station 101 via a corresponding reverse link. Each reverse link is maintained by a reverse link signal, such as reverse link signals 107–109 for respectively mobile stations 102–104. Base station 101 may also transmit a predefined series of data bits on a pilot channel via the forward link to all mobile stations to assist each mobile station in decoding the forward link signal 106. Each of the mobile stations 102–104 may transmit a pilot channel to base station 101. The pilot channel transmitted from a mobile station may be used for decoding the information carried by the reverse link signal transmitted from the same mobile station. The use and operation of a pilot channel are well known. A transmitter and a receiver for communicating via the forward and reverse links are included in each mobile station 102–104, and base station 101.

Figure 2:
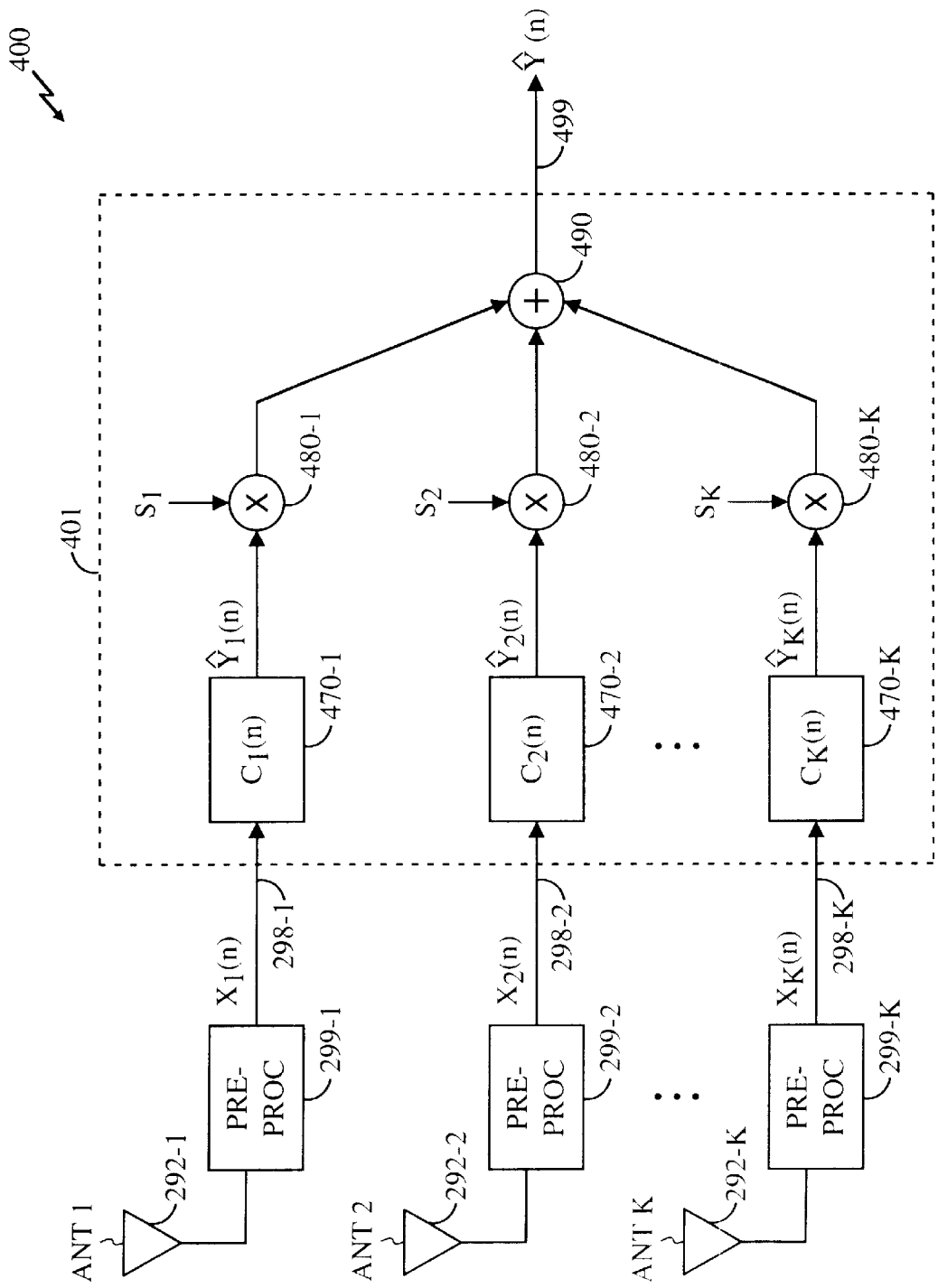
FIG. 2 illustrates a receiver block diagram in a communication system receiver for minimizing a combined local and global mean square error for a signal equalization.

A block diagram of a receiver 400 is shown in FIG. 2. Receiver 400 may have several antennas 292-1 to 292-K for receiving the transmitted signal waveform. The signals received at antennas 292-1 to 292-K may be processed in corresponding pre-processing blocks 299-1 to 299-K to produce corresponding signals 298-1 to 298-K. The pre-processing blocks 299-1 to 299-K may include several operations not shown, such as RF/IF downconvertors, AGC (automatic gain control) compensation, A/D (analog-to-digital) conversion. The signals 298-1 to 298-K pass through an equalizer 401 to present a signal 499 for the decoder. The signals received at antennas 292-1 to 292-K originate from a common source and carry the same stream of data symbols y[n], where "n" represents the temporal index of the symbols in the received data stream.

In communications system 100, the stream of data symbols y[n] may be transmitted from any of the mobile stations 102–104 through a communication channel to receiver 400 in base station 101, or from a base station 101 to any of the mobile stations 102–104. Receiver 400 may be incorporated in base station 101 for receiving signals from a mobile station over a dispersive channel, or in a mobile station 102–104 for receiving signals from base station 101 over a dispersive channel. Equalizer 401 may include a number of finite impulse response (FIR) filters 470-1 to 470-K. Although several filters 470-1 to 470-K are shown in FIG. 2, the implementation of the filters may be different in various embodiments. In one case, one filter may be used repeatedly to process all the signals 298-1 to 298-K. In another case, a filter may be dedicated to each signal 298-1 to 298-K from the antennas 292-1 to 292-K. The equalizer for the path from the mth antenna may be a tapped delay line FIR filter with temporal coefficients $C_m[n]$. Use and operation of FIR filters are well known in the art.

The output of each of the filters 470-1 to 470-K represents an estimate of a transmitted data symbol in the data stream y[n]. The output of filter 470-1 at time n, received via a signal at antenna 292-1, can be represented as follows:

$$\hat{y}_1[n] = \sum_{k=-M}^{M} (C_1^k[n])^* X_1[n, k] \quad (1)$$

where the FIR filter 470-1 has 2M+1 taps given by $\{C_1^k[n]: k=-M, \ldots, M\}$,* denotes complex conjugation, and $\{X_1[n,k]: k=-M, \ldots, M\}$ denotes the tapped delay-line contents at time n. The outputs of filters 470-1 to 470-K are scaled by the multipliers 480-1 to 480-K each of which has an associated spatial coefficient $S_m[n]$. After the scaling operation, the resulting signals are summed in a combiner 490 to form a combined signal 499 which represents a combined symbol estimate $\hat{y}[n]$ of the transmitted data symbol y[n]. The combined signal 499 may be represented as:

$$\hat{y}[n] = \sum_{m=1}^{K} (S_m[n])^* \hat{y}_m[n] \quad (2)$$

To minimize the effects of receiver noise, multipath interference, and intersymbol interference in signal 499, the temporal coefficients $C_m[n]=\{C_m^k[n]: k=-M, \ldots, M\}$ and the spatial coefficients $S_m[n]$, for each m, can be optimized in accordance with an embodiment. The signal 499 would then carry an estimate of the transmitted data symbols that could be decoded with improved reliability. The temporal coefficients $C_m[n]$ and spatial combiner weights $S_m[n]$, for m=1, ..., K, may be optimized using the Minimum Mean Square Error (MMSE) criterion in several possible ways.

One method, called Local Optimization, optimizes the temporal coefficients $C_m[n]$ for the m-th antenna based solely on minimizing the MSE between the transmitted symbol y[n] and the local estimate of the transmitted symbol $\hat{y}_m[n]$, i.e., the FIR output signal 470-m for the m-th antenna branch. The temporal coefficients $C_m[n]$ are selected to minimize the Local MSE defined as:

$$\text{Local}MSE = E|y[n] - \hat{y}_1[n]|^2 + E|y[n] - \hat{y}_2[n]|^2 + \ldots + E|y[n] - \hat{y}_K[n]|^2 \quad (3)$$

After the temporal coefficients $C_m[n]$ for each antenna branch are determined, the spatial combiner weights $S_m[n]$ are chosen to minimize the mean square error (MSE) in the combined output signal $\hat{y}[n]$.

Another method, called Global Optimization, optimizes the temporal coefficients $C_m[n]$ and spatial combiner weights $S_m[n]$ for all antennas jointly, using the combined output signal $\hat{y}[n]$. For Global Optimization, the temporal coefficients and combiner weights are selected jointly to minimize the Global MSE:

$$\text{Global}MSE = E|y[n] - \hat{y}[n]|^2. \quad (4)$$

The spatial combiner weights $S_m[n]$ may be set equal to one in an exemplary embodiment.

These respective optimizations may be carried out using adaptive signal processing algorithms that are well known in the art, e.g., the Least Mean Square (LMS) algorithm and its variants. When such an adaptive algorithm is used for optimizing the temporal coefficients $C_m[n]$ and spatial coefficients $S_m[n]$, the number of samples (i.e. the amount of training time) required for the coefficients to converge to their steady-state (i.e., MMSE-optimal) values is greater for Global Optimization than for Local Optimization. However, the steady-state MSE is generally lower for Global Optimization. The present embodiment, called Combined Global-Local Optimization, improves on both these approaches to achieve a balance between low steady state MSE and fast convergence time.

Define the Combined MSE for a value of α between zero and one as follows:

$$\text{Combined}MSE = \alpha\{E|y[n] - \hat{y}_1[n]|^2 + E|y[n] - \hat{y}_2[n]|^2 + \ldots + E|y[n] - \hat{y}_K[n]|^2\} + (1-\alpha)\{E|y[n] - \hat{y}[n]|^2\} \quad (5)$$

When α is set equal to zero, minimizing the Combined MSE amounts to Global Optimization, whereas if α is set equal to one, minimizing the combined MSE amounts to Local Optimization. In the embodiment, the value for α, may be any number between zero and one ($0 \leq \alpha \leq 1$). The parameter α, specifies the relative weight of the Local and Global MSE in the combined optimization. Proper selection of α could allow the adaptive algorithm to achieve a better combination of fast convergence time and low steady state MSE.

In accordance with an embodiment, once a particular value of α has been selected, one can choose step-size parameters $\Delta_c$ and $\Delta_s$ and update the temporal coefficients $C_m[n]$ and spatial coefficients $S_m[n]$ in an iterative fashion. For example, the temporal and spatial coefficients associated with the first antenna branch, i.e., $C_1[n]$ and $S_1[n]$, can be updated as follows: For a fixed set of spatial coefficients $S_1[n]$, $C_1[n]$ is updated by:

$$C_1^k[n+1] = \quad (6)$$
$$C_1^k[n] + \Delta_c X_1[n, k](\alpha(y[n] - \hat{y}_1[n])^* + (1-\alpha)S_1^*[n](y[n] - \hat{y}[n])^*)$$

where k indexes the coefficients in the FIR filter of 470-1, $\Delta_c$ is the step-size parameter for the temporal coefficients and $C_1[n+1]$ denotes the updated temporal coefficients at time n+1. Next, for a fixed set of temporal coefficients $C_1[n]$, $S_1[n]$ is updated by:

$$S_1[n+1]=S_1[n]+\Delta_s \hat{y}_1[n](y[n]-\hat{y}[n])^* \quad (7)$$

where $\Delta_s$ is the step-size parameter for the spatial coefficients and $S_1[n]$ denotes the updated spatial coefficients at time n+1. The temporal coefficients $C_m[n]$ and spatial coefficients $S_m[n]$ for the other antenna branches are updated analogously. The step-size parameters $\Delta_c$ and $\Delta_s$ can be any values which guarantee convergence of the iterative updates. Methods for selecting step-size parameters meeting these requirements are well known in the art. Furthermore, it follows by methods well known in the art that these nested iterations converge to a solution which achieves the CombinedMSE.

Figure 3:
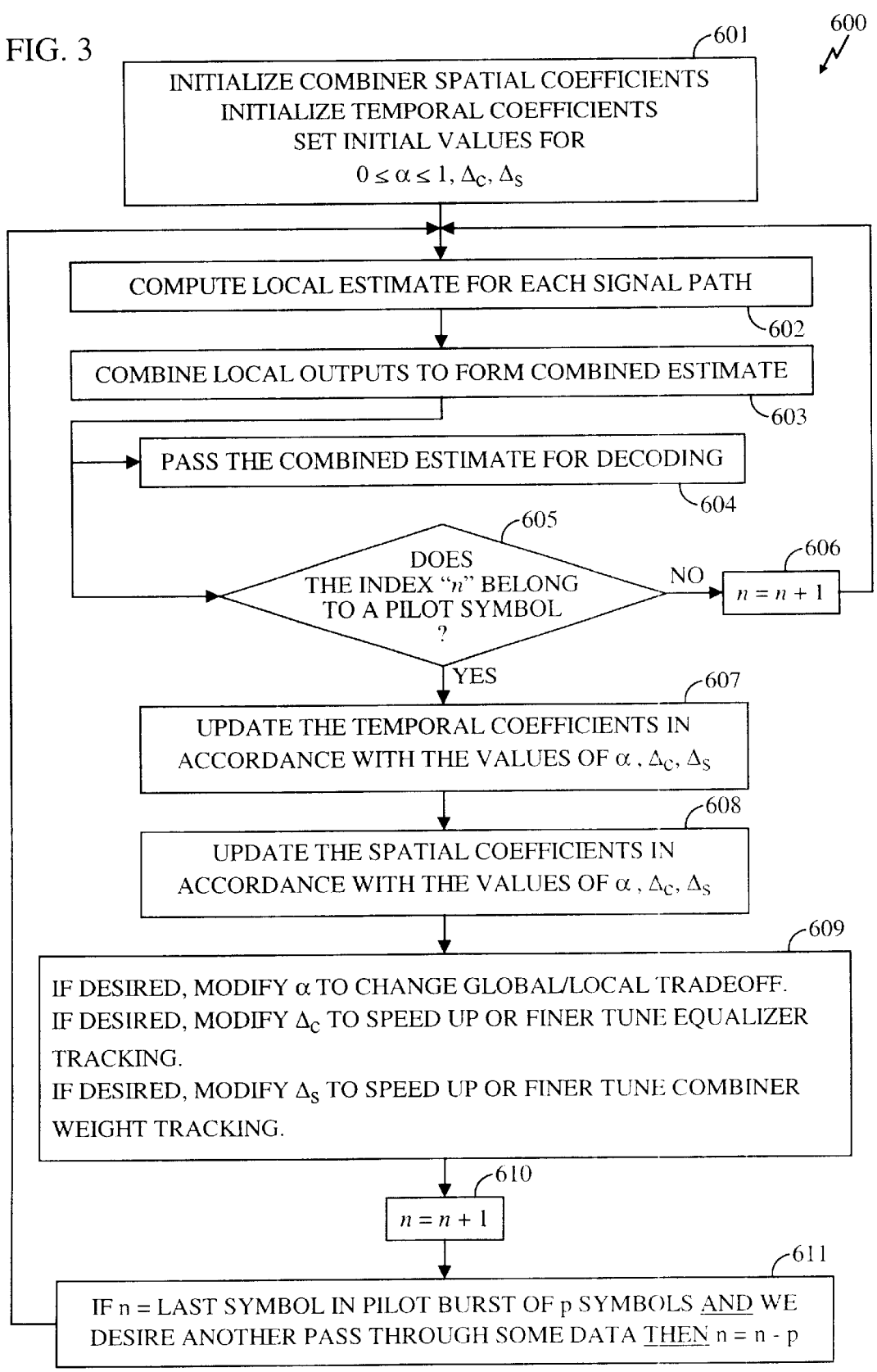
FIG. 3 illustrates a flow chart for minimizing the combined local and global mean square error for a signal equalization.

FIG. 3 shows a flow chart 600 depicting one or more steps necessary to perform a combined optimization of the temporal coefficients $C_m[n]$ and spatial coefficients $S_m[n]$. Various steps of the flow chart 600 may be performed by a control system. At step 601, the temporal coefficients $C_m[n]$ and spatial coefficients $S_m[n]$ are initialized and the initial values of the parameters $\alpha$, $\Delta_c$ and $\Delta_s$ are selected. At step 602, an estimate $\hat{y}_m[n]$ of the transmitted symbol is generated for the m-th antenna branch using $X_m[n]$, the data stream received on antenna m, and the temporal coefficients $C_m[n]$. At step 603, the estimates on each of the antenna branches are combined, using the spatial combiner coefficients $S_m[n]$, to generate a combined estimate $\hat{y}[n]$ of the data symbol. The combined estimate may be passed at step 604 to a decoder and may be evaluated in step 605 to determine whether additional updates of the temporal and spatial coefficients is required. Additional updates may not be necessary when the MSE error is at an acceptably small level. At step 606, the counter is incremented for the next data symbol and the process proceeds to step 602. At step 607 and 608, the values of the temporal coefficients $C_m[n]$ and spatial coefficients $S_m[n]$ are updated in accordance with the parameters $\alpha$, $\Delta_c$ and $\Delta_s$. At step 609 the parameters $\alpha$, $\Delta_c$ and $\Delta_s$ may be adjusted, if desired, from the initial values set at step 601. For example, by adjusting $\alpha$, the compromise between Local Optimization and Global Optimization can be controlled. When the value for a approaches zero, the updates are effectively those of Global Optimization rather than Local Optimization. Similarly, when the value for a approaches one, the updates are effectively those of Local Optimization rather than Global Optimization. This allows the possibility of trading off faster convergence for increased magnitude of the MSE error, and vice-versa. Reducing the values for the step-size parameters $\Delta_c$ and $\Delta_s$ yields lower steady-state MSE at the expense of slower convergence of the iterations. Increasing the values for the step-size parameters $\Delta_c$ and $\Delta_s$ speeds up the convergence of the iterations but results in increased steady-state MSE. At step 610, the counter is incremented for the next pilot symbol. At step 611, the process determines whether the last data symbol in the training interval has been processed. If additional processing over the same stream of data is desired, the proceeds to step 602.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a communication system, a method comprising:

receiving a plurality of signals from a common source, wherein said plurality of signals carries a common stream of data symbols;

combining a local MSE and a global MSE in accordance with a weighting factor to produce said combined local and global MSE; and minimizing said combined local and global mean square error (MSE) over said received signals.

2. The method as recited in claim 1 wherein said weighting factor has a value between zero and one.

3. The method as recited in claim 1 further comprising:

determining temporal and spatial coefficients for said combined global and local MSE based on said weighting factor.

4. The method as recited in claim 3 further comprising:
adjusting said temporal coefficients in accordance with a temporal coefficient step size for said minimizing of combined local and global MSE.

5. The method as recited in claim 4 further comprising:
adjusting said temporal coefficient step size for said minimizing of combined local and global MSE.

6. The method as recited in claim 3 further comprising:
adjusting said spatial coefficients in accordance with a spatial coefficient step size for said minimizing of combined local and global MSE.

7. The method as recited in claim 6 further comprising:
adjusting said spatial coefficient step size for said minimizing said combined local and global MSE.

8. The method as recited in claim 1 further comprising:
adjusting said weighting factor to achieve a corresponding effect of at least one of processing speed and error magnitude in said minimizing said combined local and global MSE.

9. The method as recited in claim 1 further comprising:
producing a combined signal after said minimizing said combined local and global MSE over said received signals.

10. The method as recited in claim further comprising:
decoding said combined signal to retrieve said common stream of data symbols.

11. The method as recited in claim 1 wherein said combined local and global MSE is in accordance with a $$\text{Combined}MSE = \alpha\{E|y[n]-\hat{y}_1[n]|^2 + E|y[n]-\hat{y}_2[n]|^2 + \ldots + E|y[n]-y_K[n]|^2\} + (1-\alpha)\{E|y[n]-\hat{y}[n]|^2\}$$

wherein $\alpha$ is a weighting factor.

12. In a communication system, an apparatus comprising:
a receiver for receiving a plurality of signals from a common source, wherein said plurality of signals carries a common stream of data symbols;
a processor for combining a local MSE and a global MSE in accordance with a weighting factor to produce said combined local and global MSE minimization; and
an equalizer for minimizing said combined local and global mean square error (MSE) over said received signals.

13. The apparatus as recited in claim 12 wherein said weighting factor has a value between zero and one.

14. The apparatus as recited in claim 12 wherein said processor is configured for determining temporal and spatial coefficients for said combined global and local MSE based on said weighting factor.

15. The apparatus as recited in claim 14 wherein said processor is configured for adjusting said temporal coefficients in accordance with a temporal coefficient step size for said minimizing said combined local and global MSE.

16. The apparatus as recited in claim 15 wherein said processor is configured for adjusting said a temporal coefficient step size for said minimizing said combined local and global MSE.

17. The apparatus as recited in claim 14 said processor is configured for adjusting said spatial coefficients in accordance with a spatial coefficient step size for said minimizing said combined local and global MSE.

18. The apparatus as recited in claim 17, wherein said processor is configured for adjusting said spatial coefficient step size for said minimizing said combined local and global MSE.

19. The apparatus as recited in claim 12 wherein said processor is configured for adjusting said weighting factor to achieve a corresponding effect of at least one of a processing speed and an error magnitude in said minimizing said combined local and global MSE.

20. The apparatus as recited in claim 12 wherein said equalizer is configured for producing a combined signal after said minimizing said combined local and global MSE over said received signals.

21. The apparatus as recited in claim 20 further comprising:
a decoder for decoding said combined signal to retrieve said common stream of data symbols.

22. The apparatus as recited in claim 12 further comprising a plurality of antennas coupled to said receiver for correspondingly receiving said plurality of signals.

23. In a communication system, an apparatus comprising:
a means for receiving a plurality of signals from a common source, wherein said plurality of signals carries a common stream of data symbols;
a processor means for combining a local MSE and a global MSE in accordance with a weighting factor to produce said combined local and global MSE minimization; and
a signal equalizer means for minimizing said combined local and global mean square error (MSE) over said received signals.

* * * * *